United States Patent [19]

Tojima

[11] Patent Number: 5,054,598

[45] Date of Patent: Oct. 8, 1991

[54] CLUTCH COVER ASSEMBLY

[75] Inventor: Hiromi Tojima, Osaka, Japan

[73] Assignee: Kabushiki Kaisha Daikin Seisakusho, Osaka, Japan

[21] Appl. No.: 465,233

[22] PCT Filed: Jul. 12, 1989

[86] PCT No.: PCT/JP89/00704

§ 371 Date: Mar. 15, 1990

§ 102(e) Date: Mar. 15, 1990

[87] PCT Pub. No.: WO90/01641

PCT Pub. Date: Feb. 22, 1990

[30] Foreign Application Priority Data

Aug. 1, 1988 [JP] Japan .......................... 63-102206[U]
Feb. 8, 1989 [JP] Japan .................................. 1-14388

[51] Int. Cl.$^5$ ...................................... F16D 13/50
[52] U.S. Cl. .............................. 192/70.27; 192/89 B
[58] Field of Search ........................ 192/70.27, 89 B

[56] References Cited

U.S. PATENT DOCUMENTS

| 4,676,357 | 6/1987 | Troyman et al. | 192/89 B |
| 4,678,071 | 7/1987 | Ball et al. | 192/89 B X |
| 4,681,200 | 7/1987 | Keck | 192/70.27 |
| 4,744,448 | 5/1988 | Maycock et al. | 192/89 B X |
| 4,751,990 | 6/1988 | Schraut et al. | 192/70.27 |
| 4,770,282 | 9/1988 | Macock et al. | 192/70.27 |

FOREIGN PATENT DOCUMENTS 45-15366 6/1970 Japan .
59-2337 1/1984 Japan .
62-224729 10/1987 Japan .

*Primary Examiner*—Allan D. Herrmann
*Assistant Examiner*—Nicholas Whitelaw
*Attorney, Agent, or Firm*—Armstrong, Nikaido, Marmelstein, Kubovcik & Murray

[57] ABSTRACT

A clutch cover assembly for passenger car or the like comprising a pressure plate (10, 113) having a series of projections (11, 125) and a damper member (20,127) for a gradual engagement. According to the first aspect of the invention, the damper member is in the form of a series of wave wires forming into a bow-shaped wire rod alonging in the circumferential direction and having projections rising in an axial direction for preventing a partial abrasion of the projections (11, 125) or the like. According to the second aspect of the invention, fulcrum portions (128) are formed on the projection (125) for pivotting the outer periphery of the diaphragm spring (114) while the clutch is being engaged so as to prevent the entire compression of the damper member (127) and as to precise the positioning of distance (L2) between the fulcrums (P1) and (P2).

16 Claims, 8 Drawing Sheets

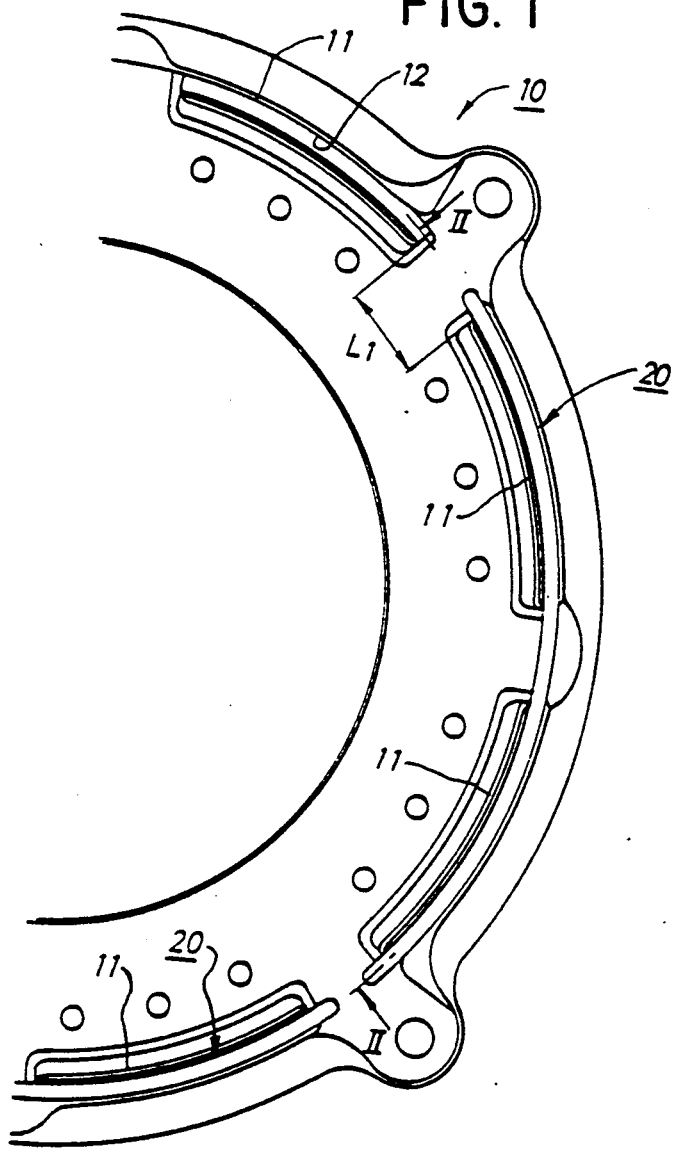
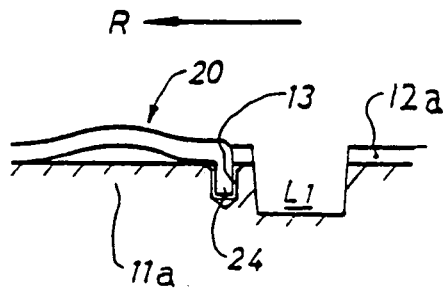
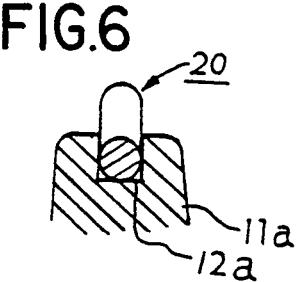
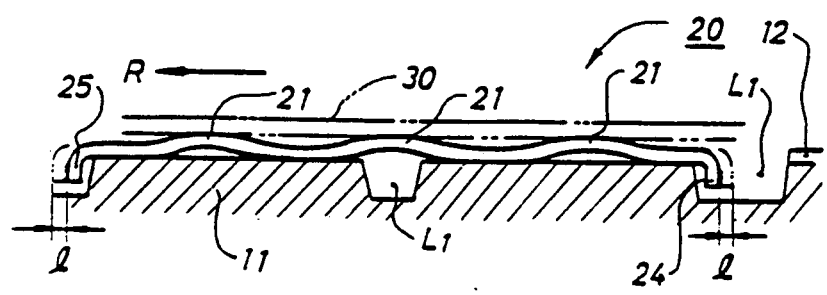

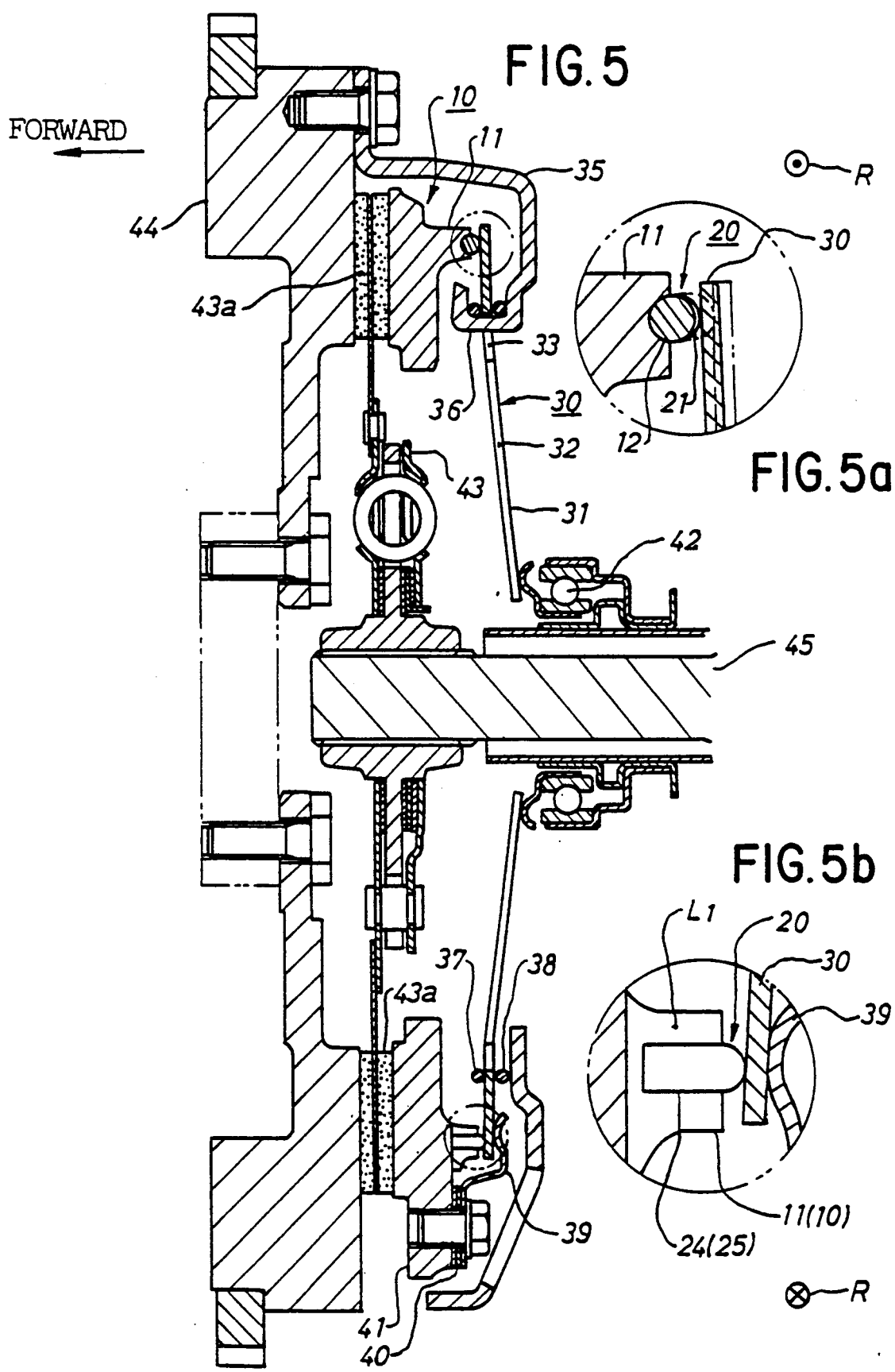

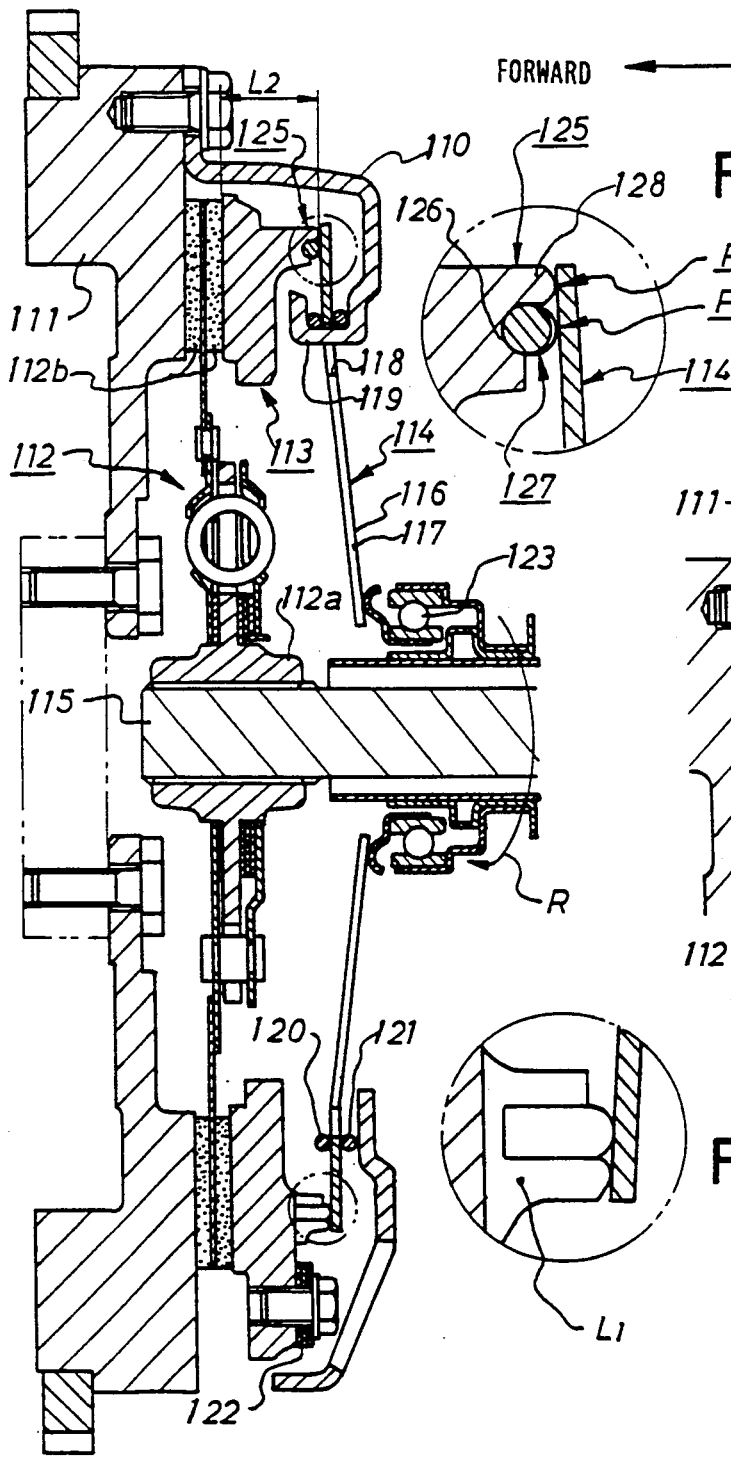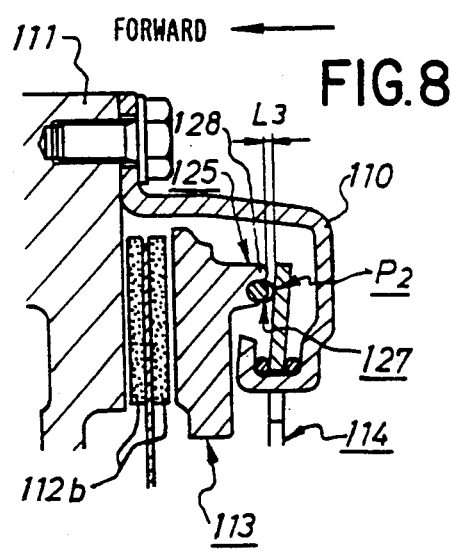

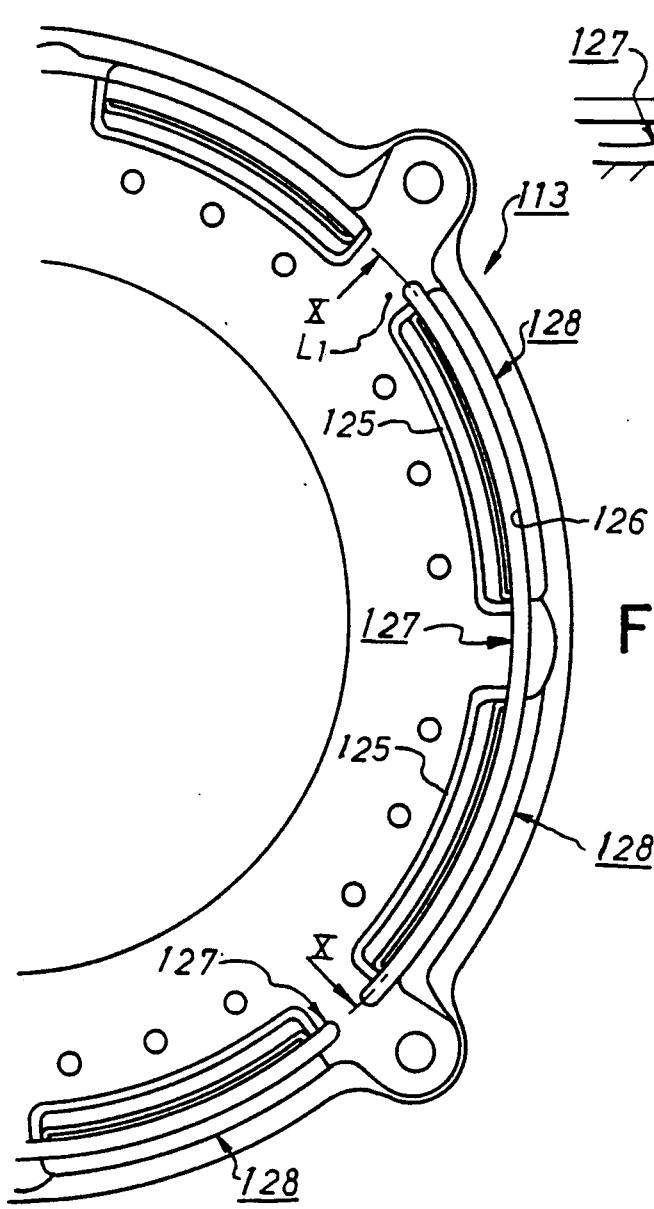
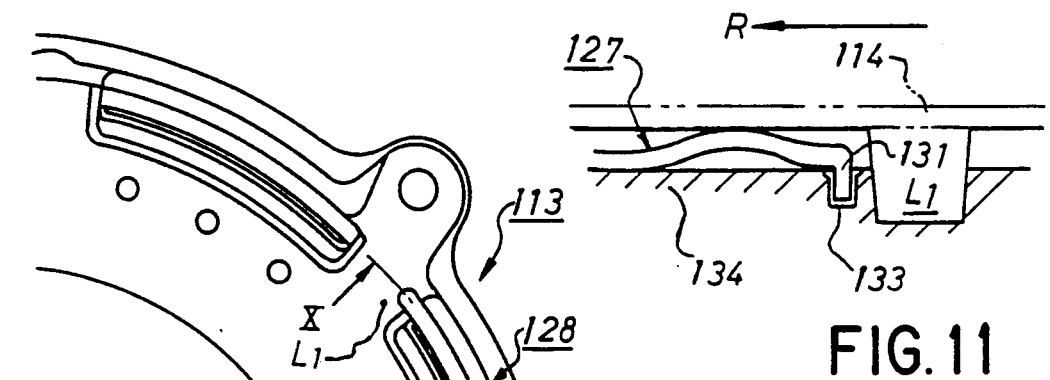
FIG. 11
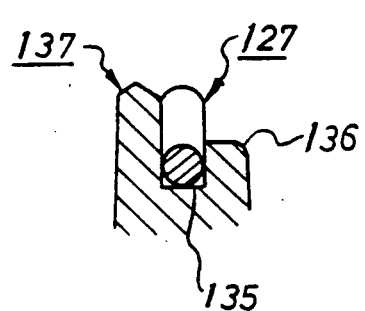
FIG. 12
FIG. 9
FIG. 10
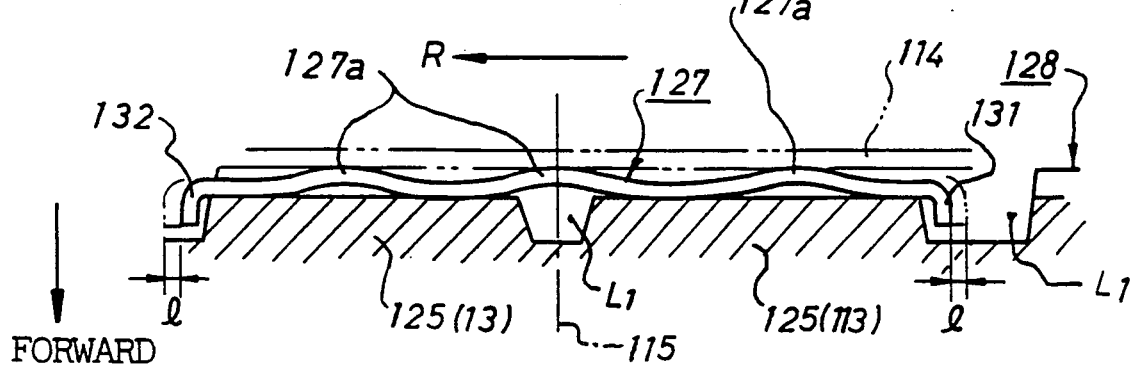

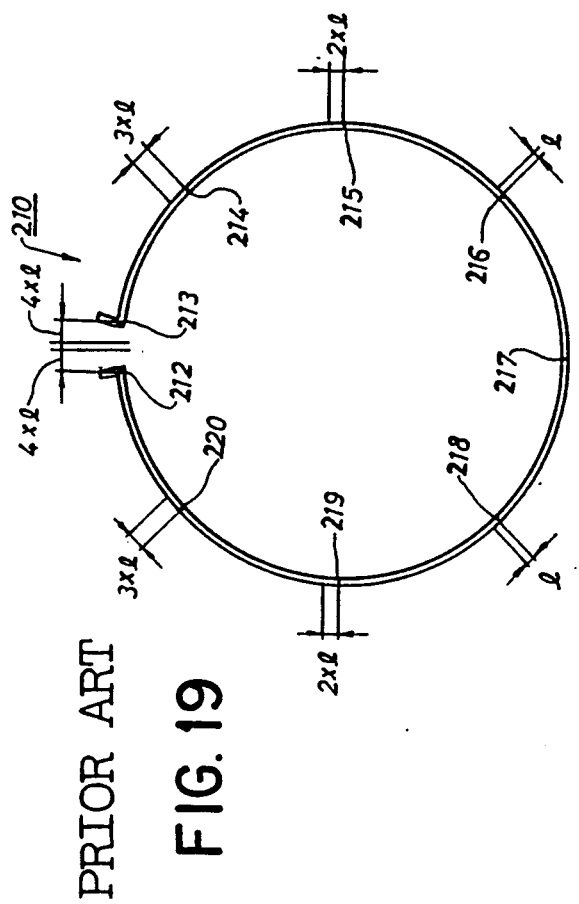
PRIOR ART FIG. 19
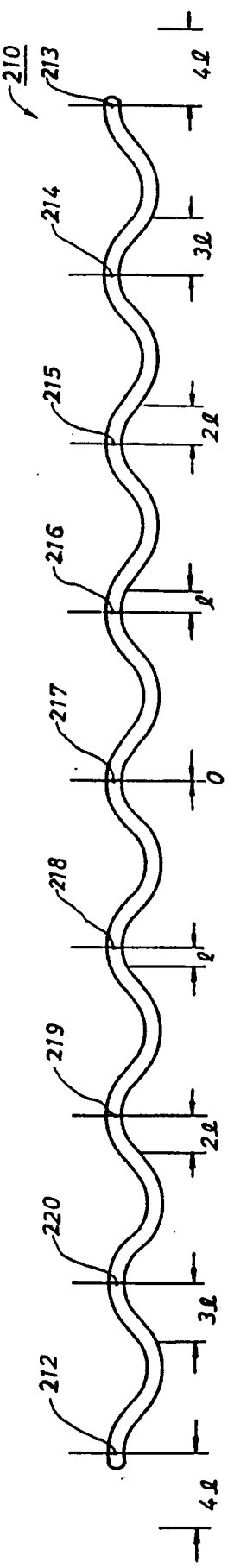
PRIOR ART FIG. 20

CLUTCH COVER ASSEMBLY

TECHNICAL FIELD OF THE INVENTION

This invention relates to a clutch cover assembly for smooth clutch engagement.

BACKGROUND ART

It is generally known that a gradual increase in a torque in a rotating direction at the initial stage in a process of engagement of the clutch gives good drive feelings and enables an operator to carry out smooth operation.

An arrangement having a series of elastic cushioning plates connecting a spline hub of a clutch disc with a pair of friction facings is also known to obtain the gradual increase in the torque at the initial stage. However, such cushioning plates must have sufficient rigidity for transmitting torque, so that there is a limitation to obtaining gradual increase in torque at the initial stage by such arrangement.

In order to overcome the above mentioned problem, another arrangement, as shown in FIG. 18, is proposed in the Japanese Examined Utility Model Publication No. 59-2337. In this arrangement, a pressure plate 200 has a rear surface forming thereon with a series of projections 201 for contacting with a diaphragm spring 202. An annular wave wire ring 210, rising and falling in an axial direction, is mounted between the projections 201 and an outer periphery of the diaphragm spring 202 so as to obtain gradual increase in torque at the initial stage.

However, in such the arrangement, as shown in FIGS. 19 and 20, because the wave wire ring 210 is formed in a wire rod, sliding quantity of the end portion 212 or the other end portion 213 of the wave wire ring 210 will be magnified by accumulating sliding quantity of each projection portion 214, 215, 216, 217, 218, 219 and 220 from intermediate projection 217 to the both end portions 212 and 213. For example, as shown in FIGS. 19 and 20, let l be the same sliding quantity of each projection 214, 215, 216, 217, 218, 219 and 220 and let the datum point be the intermediate projection 217, the sliding quantity of the projection 218 next of the datum point is l, a sliding quantity of the projection 219 become $2 \times l$, a sliding quantity of the projection 220 become $3 \times l$, so that the quantity at the end portion 212 become $4 \times l$. Thus, abutting portions of the rear surface of the pressure plate 200 (FIG. 18) and the diaphragm spring 202, with the wave wire ring 210, are partially worn away as near to the end portions from the datum point, so that the disadvantage may occur, that is, the dislocation of fulcrum as to a quantity of partial abrasion.

In order to avoid the disadvantage, another arrangement is proposed in the Japanese Unexamined Patent Publication No. 62-13830. In the arrangement, a wave wire ring is provided with a series of saddles so that the deflected quantity is distributed among the specified places where the saddles are mounted by applying the clutch engage load to the wave wire ring through the saddles. However, in such arrangement, many complicated members, i.e. saddles, must be mounted on the wave wire ring. This causes not only time for manufacturing, but also breakdown due to the coming off of the saddles in use.

Accordingly, it is an object of the present invention to provide an improved clutch cover assembly, overcoming the above mentioned disadvantage, in which a damper member for obtaining a gradual increase in the torque at the initial stage of engagement of a clutch is obtained by a series of bow-shaped wave wires arranged with spaces therebetween in a circumferential direction.

In the prior art arrangement of FIG. 18, the clutch engage load is applied to wave wire 210 by the diaphragm spring 202, while the clutch is being engaged, so that the wave wire 210 may be entirely pressed by the diaphragm spring 202. Therefore, the spring force of the wave ring 210 may be weakened. Thus, the spring constant of wave wire 210 is apt to dislocate.

Moreover, in the prior art arrangement of FIG. 18, because the placing of the fulcrum P10 is determined by balancing the force of the diaphragm spring 202 with the reaction force of the wave wire spring 210, the distance L10, measured from the friction surfaces of cutch facings 211 and the pressure plate 200 to the fulcrum P10, may be unstable and apt to shorten because of decay of the wave wire spring 210 in use thereof.

Accordingly, it is a further object of the present invention to provide an improved clutch cover assembly, overcoming the above mentioned disadvantage, which clutch cover assembly comprising a fulcrum portion pivoting an outer periphery of a diaphragm spring while the clutch is being engaged and a damper member pivots the outer periphery of the diaphragm spring while the clutch is being disengaged.

Another prior art, Japanese Unexamined Patent Publication No. 61-228127 discloses an arrangement in which a wire ring is provided with sleeves of different diameters for two-stage absorbtion. However, in such arrangement, the sleeves must be manufactured and mounted on the wire ring, one, by one and results in high cost. Durability and accuracy, which is intended in the present invention, may not also be obtained.

DISCLOSURE OF THE INVENTION

The first aspect of the invention for solving the above mentioned problem, provides a clutch cover assembly comprising an annular-shaped pressure plate and diaphragm spring disposed at the rear side of the pressure plate. The pressure plate has a rear surface forming thereon a series of projections arranged in a circumferential direction with spaces therebetween and projecting toward an outer periphery of the diaphragm spring. A damper member is mounted at the top portions of the projections for receiving the outer periphery of the diaphragm spring which presses the pressure plate toward a flywheel. The damper member is in the form of a series of wave wires forming into a bow-shaped wire rod extending in a circumferential direction and having projections rising in an axial direction. Each wave wires has at least one end portion forming a stopper member. The projections of the pressure plate have top portions forming therein grooves extending in the circumferential direction. The wave wires are mounted in the grooves and arranged with spaces therebetween in the circumferential direction.

The second aspect of the invention provides a clutch cover assembly comprising an annular-shaped pressure plate and diaphragm spring disposed at rear side of the pressure plate. The pressure plate has a rear surface forming thereon a series of projections arranged in a circumferential direction with spaces therebetween and projecting toward an outer periphery of the diaphragm spring. The projections have formed thereon fulcrum portions for receiving the outer periphery of the diaphragm spring while the clutch is engaged and, mounted thereon, a damper member for receiving the outer periphery of the diaphragm spring while the clutch is disengaged.

BRIEF DESCRIPTION OF THE INVENTION

FIG. 1 is a schematic partial rear elevational view of an annular pressure plate of the invention.

FIG. 2 is a sectional view taken along line II—II of FIG. 1.

FIG. 3 is a partial sectional view of another embodiment of projection of the invention.

FIG. 5 is a vertical sectional view of the invention.

FIG. 6 is a cross sectional view of another groove of the invention.

FIG. 7 is a vertical sectional view of another embodiment of the invention.

FIG. 8 is an enlarged view of essential portion of the FIG. 7 in which the clutch is disengaged.

FIG. 9 is a schematic partial rear elevational view of a pressure plate shown in FIGS. 7 and 8.

FIG. 10 is a sectional view taken along line X—X of FIG. 9.

FIG. 11 is a partial sectional view of another projection of pressure plate.

FIG. 12 is a partial sectional view of another projection of pressure plate.

FIG. 19 is a rear elevational view of the damper member shown in FIG. 18.

FIG. 20 is a developed view of the damper member shown in FIG. 19.

BEST MODE FOR CARRYING OUT THE INVENTION

Figure 4:
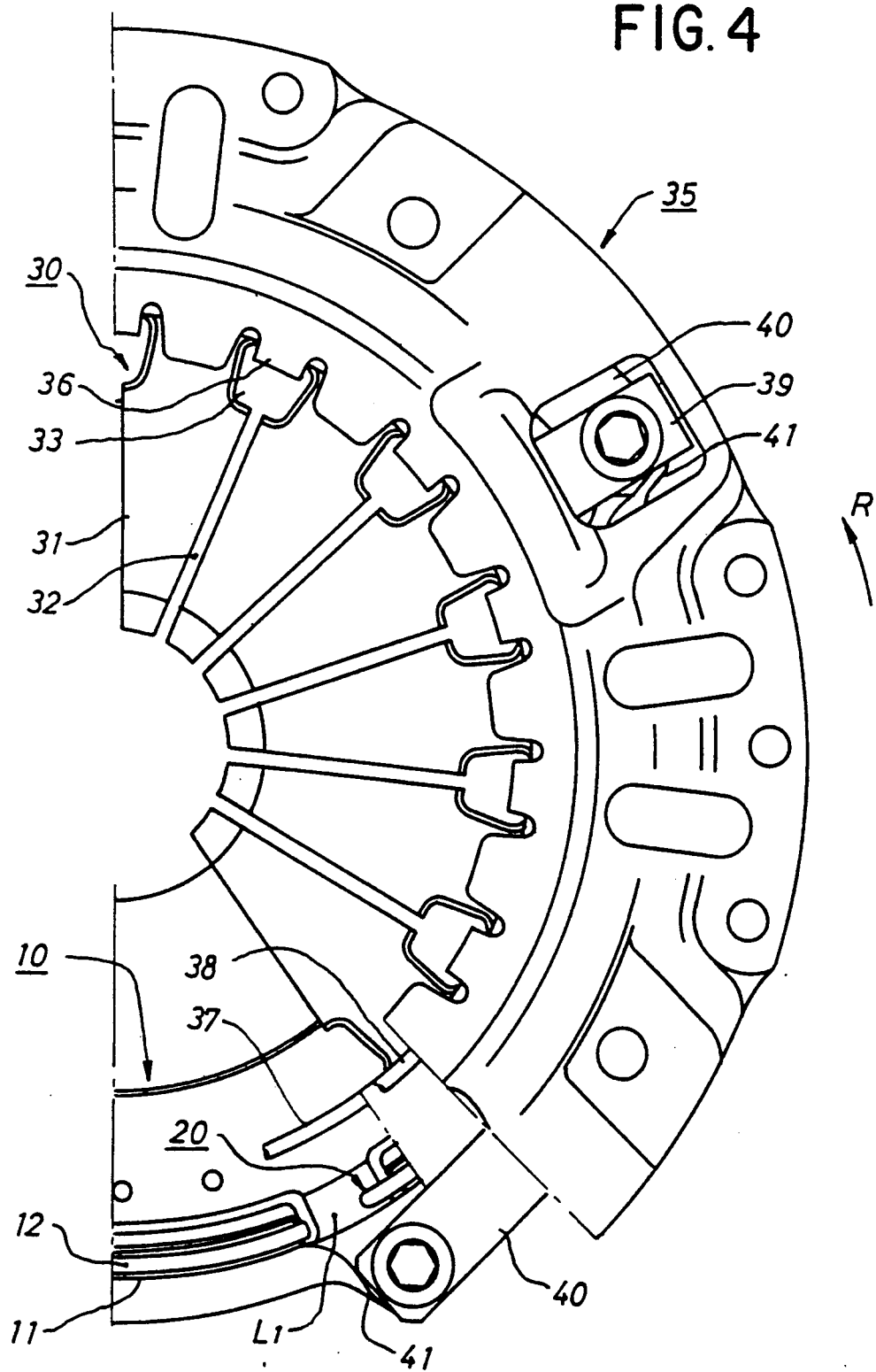
FIG. 4 is a schematic partial rear elevational view of the invention.

As shown in FIG. 1, an annular pressure plate 10 has a rear surface integrally forming thereon eight (of four is shown) projections 11 arranged in a circumferential direction with spaces therebetween. Each projection 11 has a top portion, forming therein a groove 12 extending in the circumferential direction, and is communication with spaces L1 formed between the aligning projections 11. Four (of two is shown in FIG. 1) bow-shaped wave wires 20 are arranged with spaces therebetween in the circumferential direction and mounted in the grooves 12.

Wave wires 20 are made of metal rod which has rigidity for high spring constant. Wave wires 20 are formed into a wave shape which has e.g. three projections 21, FIG. 2, rising toward a diaphragm spring 30 along with an axial direction of the clutch. Opposite ends of each wave wire 20 are forming with stopper portions, or pegs, 24 and 25 bent downward, FIG. 2, and engaging with the spaces L1. Pegs 24 and 25 prevent the wave wires 20 from leaving the specified places to the circumferential direction. As shown in FIG. 3, the peg 25 may be omitted in case that the peg 24 is fitted in a hole 13 formed in a projection 11a. Fitting in the hole 13, the peg 24 will sufficiently prevent the wave wires 20 from leaving the specified places in the circumferential direction even if inertia is applied thereon in opposite to rotating direction of R.

As shown in FIG. 1, and as explained hereinbefore, the wave wires 20 are arranged with spaces therebetween in the circumferential direction and mounted in the grooves 12. Thus, as shown in FIG. 2, the sliding quantity l, determined by deflecting projections 21, is distributed along opposite sides of the wave wires 20. Furthermore, because the quantity l will be a half of total quantity of three projections 21, it can be proportionally minimized by increasing the number of wave wires 20 compare with the wave ring. Thus, maldistribution of the quantity l and partial abrasion of the pressure plate 10 and diaphragm spring 30 is avoided.

In this embodiment, the wave wire 20 is mounted on two projections 11 in such a way that the projection 21 formed at a center of the wave wires 20 is aligned with the space L1 in the axial direction so as to prevent abutting projections from fitting the spaces L1. Thus, the clutch is smoothly engaged or disengaged without any bad influences.

As shown in FIGS. 4 and 5, a diaphragm spring 30 is concentrically disposed at the rear side of the pressure plate 10. Diaphragm spring 30 has formed thereon a series of tongues 31 extending radially to the center. Slits 32 are formed between the aligning tongues 31 with openings 33 at radial outer peripheries thereof. Tubs 36 are formed at an inner periphery of the clutch cover 35 and fit the openings 33 and hold the diaphragm spring 30 through a pair of wire rings 37 and 38. Clips 39 hold the wave wires 20 through an outer periphery of the diaphragm spring 30, so that the outer periphery of the diaphragm spring 30 and the wave wires 20 do not separate but move as a segment at any time. Elastic straps or leaf springs, designated 40, connect the pressure plate 10 to the clutch cover 35, slightly urging the pressure plate 10 so as to rotate the pressure plate 10 in the rotating direction R of the clutch cover 35. Each end portion of the straps 40 opposite to the rotating direction R is connected to the corresponding projection 41 at an outer periphery of the pressure plate 10. In FIG. 5, 42 is a release bearing. 43 is a clutch disc. 43a is a friction facing of the clutch disc 43. 44 is a flywheel. 45 is an output shaft or input shaft of a transmission (not shown).

An operation of the clutch cover assembly is as follows.

When the clutch is engaged, the outer periphery of the diaphragm spring 30 will press the pressure plate 10 toward the flywheel 44 through the projections 21 of wave wires 20, as can be seen in FIG. 5. This causes the pressure plate 10 to press forwardly the friction fasings 43a of the clutch disc 43. A torque in the rotating direction R is smoothly transmitted from the flywheel 44 through the clutch disc 43 to the output shaft 45.

When a conventional clutch pedal (not shown) is depressed in the usual manner, the release bearing 42 is moved forwardly and presses a rear surface of inner periphery of the diaphragm spring 30. Thus, the outer periphery of the diaphragm spring 30, which is pivoted by a pair of the wire rings 37 and 38 will react rearwardly and will resulting the pressure plate 10 release the friction facings 43a. Hence, the clutch is disangaged.

When the clutch pedal is released to pull the release bearing 42 rearwardly from the above mentioned situation, the outer periphery of the diaphragm spring 30 will press the pressure plate 10 through the wave wires 20 toward the flywheel 44. In the process, the projections 21 of wave wires 20 deflect in the clutch axial direction and absorb the spring force of the diaphragm spring 30, so that the rotating torque of flywheel 44 is smoothly transmitted to the friction facings 43a. Thus, the rotating torque at initial stage of clutch engagement will be gradually increased.

Furthermore, in the present invention, because the bow-shaped wave wires 20 are arranged with spaces therebetween in the circumferential direction and the projections of the wave wires 20 deflect in the clutch axial direction, sliding quantity l will be distributed among each of the both end protions of wave wires 20. Furthermore, because the quantity l will be a half of total quantity of three projections 21, it can be proportionally minimized by increasing a number of the wave wires 20. Thus, maldistribution of the quantity l can be avoided, and therefore the partial abrasion of the pressure plate 10 and diaphragm spring 30.

In this embodiment, because each wave wire 20 has both end sides forming pegs 24 and 25 engaged with spaces L1, they prevent wave wires 20 from leaving the specified places in the circumferential direction even if inertia is applied in opposite to the rotating direction R.

Grooves 12a, shown in FIG. 6, may be formed in the projections so as to fit the wave wires 20 therein.

As described above, in the clutch cover assembly according to the first aspect of the invention, the wave wires, or damper member 20 are mounted between the projections 11 of the annular pressure plate 10 and the outer periphery of diaphragm spring 30. Therefore, the clutch is smoothly engaged at initial stage of the engagement, and results good drive feelings and easy operation.

Furthermore, because the wave wires 20 are arrenged with spaces therebetween in the circumferential direction and the projections of the wave wires 20 deflect in the clutch axial direction, sliding quantity l determined by deflecting each projection 21 is distributed among the both end protions of wave wire 20. Moreover, because the quantity l will be a half of total quantity of three projections 21, it can be proportionally minimized by increasing a number of the wave wires 20. Thus, maldistribution of the sliding quantity l can be avoided, and therefore the partial abrasion of pressure plate 10 and diaphragm spring 30. Therefore, employing a series of bow-shaped wave wires 20 arranged with speces therebetween in a circumferential direction, the invention provides an improved clutch cover assembly having remarkable durability and reliability compare with the conventional one in which damper member is a wire ring.

Moreover, in the present invention, because each wave wire 20 has at least one end side forming peg 24, or stopper member engaged with spaces L1, the peg 24 prevent the wave wires 20 from leaving the specified places in the circumferential direction even if the inertia is applied opposite to the rotating direction R.

FIG. 7 shows another embodiment. The left side of figure is regarded as front.

As shown in FIG. 7, an outer periphery of clutch cover 110 of the present invention is fastened to an annular flywheel 111. The clutch cover 110 forms a space in which is installed a clutch disc 112, pressure plate 113, and diaphragm spring 114, respectivery concentrically arranged from the flywheel 111. The clutch disc 112 has a boss 112a spline fitted onto an output shaft or input shaft 115 of a transmission (not shown). The clutch disc 112 also has an outer periphery. Opposite sides of the outer periphery of the clutch disc 112 have bonded thereto a pair of annular friction facings 112b which function as an input member of a torque from the engine flywheel 111.

The diaphragm spring 114 has integrally formed thereon a series of tongues 116 extending radially to the center. Slits 117 are formed between the aligning tongues 116 with openings 118 at radial outer peripheries thereof. Tubs 119 are formed at an inner periphery of the clutch cover 110 and fit in the openings 118 and hold the diaphragm spring 114 through a pair of wire rings 120 and 121. Elastic straps or leaf springs, designated by 122, have end portions connected to the outer periphery of the pressure plate 113 and other end portions connected to the clutch cover 110. The straps 122 is slightly urging rearwardly and connecting the pressure plate 113 to the clutch cover 110 so as to rotate the pressure plate 113 in the direction R together with clutch cover 110. 123 is a conventional release bearing.

The pressure plate 113 has a rear surface forming integrally thereon e.g. eight projections 125 arranged with spaces therebetween in a circumferential direction. Each projection 125 has a top portion forming therein a groove 126 extending in the circumferential direction and is communication with spaces L1 (FIGS. 9 and 10) formed between the aligning projections 125. Bow-shaped wave wires 127, which are described in more detail later therein, are arranged with spaces therebetween in the circumferential direction and mounted in the grooves 126.

The projections 125 also have radial outer peripheries integrally forming fulcrum portions 128 which pivot an outer periphery of the diaphragm spring 114 as a fulcrum P1, thereby the outer periphery of diaphragm spring 114 presses the pressure plate 113 forwardly through the fulcrum portions 128 when the clutch is engaged. In such situation, the wave wires 127 are pressed to some extent by contacting a front surface of the diaphragm spring 114, so that wave wires 127 will be a fulcrum P2 for the diaphragm spring 114, as discribed hereinafter. Thus, rotation torque is smoothly transmitted to the pressure plate 113 absorbing the applied force of diaphragm spring 114 in the process that the clutch is engaged as shown in FIG. 7 from the disengaged situation as shown in FIG. 8.

A clamp member, e.g. the clips 39 explained hereinbefore and shown in FIGS. 4 and 5, holds the outer periphery of the diaphragm spring 114 to prevent it from leaving the specified place while the clutch is being disengaged. Thus, the pressure plate 113 and diaphragm spring 114 will move as a segment at any time.

As shown in FIG. 9, four (of two are shown) wave wires 127 are arranged with spaces therebetween in the circumferential direction and fit in the grooves 126. The wave wire 127 is made of metal rod which has rigidity for high spring constant. The wave wire 127 is formed into a wave shape which has e.g. three projections 127a rising toward and are in contact with the outer periphery of the diaphragm spring 114 along with an axial direction of the clutch. At opposite ends of each wave wire 127 are forming stopper members or pegs 131 and 132 are bent forwardly and are, respectively, engaged with the spaces L1 formed between the aligning projections 125. Pegs 131 and 132 prevent the wave wires 127 from leaving the specified places to the circumferential direction.

In the embodiment, the wave wires 127 are mounted on two projections 125 in such a way that the projection 127a formed at a center of the wave wires 127 are aligned with the spaces L1 in the axial direction so as to prevent the abutting projections from fitting in the spaces L1. Thus, the clutch is smoothly engaged or disengaged without any bad influences.

As shown in FIG. 11, the peg 132 may be omitted in case that the peg 131 is fitted in a hole 133 formed in a projection 125a. Fitting in the hole 133, the peg 131 will sufficiently prevent the wave wires 127 from leaving the specified places to the circumferential direction even if inertia is applied thereon opposite to the rotation direction R. In FIG. 12, 136 is a projection and 137 is a flucrum portions.

Functions or operations will be described hereinafter. When the clutch is engaged, the outer periphery of the diaphragm spring 114 will press the pressure plate 113 toward the flywheel 111 through the fulclum portions 128 of the wave wires 127, as can be seen in FIG. 7. This causes the pressure plate 113 to press forwardly the friction facings 112a of the clutch disc 112. A torque in the rotating direction R is smoothly transmitted from the flywheel 111 through the clutch disc 112 to the output shaft 115. Thus, the distance L2 between the friction surfaces of the pressure plate 113 and friction facing 112b will be stably determined because the outer periphery of the diaphragm spring 114 presses the fulcrum portions 128 which are integrally formed on the pressure plate 113.

When a conventional clutch pedal (not shown) is depressed in the usual manner, the release bearing 123 is moved forwardly and presses a rear surface of inner periphery of the diaphragm spring 114. Thus, the outer periphery of the diaphragm spring 114, which is pivoted by a pair of the wire rings 120 and 121, moves the pressure plate 113 rearwardly and releases the friction facings 112a. Hence, the clutch is disangaged. In the situation, the diaphragm spring 114 is moved away from the fulcrum portion 128 by cushioning quantity L3, and the wave wires 127 will follow in such a way that the projections 136 are in contact with the outer periphery of the diaphragm spring 114. Thus, the outer periphery of the diaphragm spring 114 will be pivotted by the wave wires 127 and will be positioned at the specified place where the clutch is perfectly disengaged.

When the clutch pedal is released to pull the release bearing 123 rearwardly from the above mentioned situation, the outer periphery of the diaphragm spring 114 will press the pressure plate 113 through the wave wires 127 toward the flywheel 111. In the process, the projections 127a of the wave wires 127 deflect in the clutch axial direction and absorb the spring force of the diaphragm spring 114, so that the torque of the flywheel 111 in the rotation direction R is smoothly transmitted to the friction facings 112a. Thus, the torque at initial stage of the clutch engagement will be gradually increased.

Furthermore, in the present invention, because the wave wires 127 are arranged with spaces therebetween in the circumferential direction and the projection of the wave wires 127 deflected in the clutch axial direction, sliding quantity l is distributed among each of the both end portions of the wave wires 127. Furthermore, because the quantity l will be a half of the total quantity of the three projections 127a, it can be proportionally minimized by increasing the number of the wave wires 127. Thus, maldistribution of the quantity l can be avoided, and therefore the partial abrasion of the pressure plate 113 and diaphragm spring 114 is also avoided.

In this embodiment, because each wave wire 127 has both end sides forming pegs 131 and 132 engaged with spaces L1, they prevent the wave wires 127 from leaving specified places to the circumferential direction even if the inertia is applied in opposite to the rotating direction R.

As described above, in the clutch cover assembly according to the second aspect of the invention, the projections 125 of the pressure plate 113 have the fulcrum portion 128 which pivot the outer periphery of the diaphragm spring 114 at P1 when clutch is engaged. The pressure plate 113 has the damper member, or wave wires 127 which pivot the outer periphery of the diaphragm spring 114 at P2 when the clutch is disengaged. Therefore, the outer periphery of the diaphragm spring 114 presses the pressure plate 113 through the fulcrum portion 128 integrally formed on the projections 125 while the clutch is being engaged, and is supported by the damper member or wave wire 127 while the clutch is being disengaged. Damper member 127 gradually transmits the spring force applying forwardly to the pressure plate 113. Hence, the torque will be transmitted gradually and smoothly, so that good drive feeling can be obtained and enable the operator to carry out easy operation.

Furthermore, according to the invention, because the fulcrum portion 128, which pivots the outer periphery of the diaphragm spring 114, is formed on the pressure plate 113, the distance L2 is stably determined. Thus, each size of the assembly can easily be determined in design or manufacturing. Hence, manufacturing cost is low and the productions are precise. Durability also is improved because the wave wires 127 are not pressed entirely while the outer periphery of the diaphragm spring 114 is being pivoted by the fulcrum portions 128.

Figure 13:
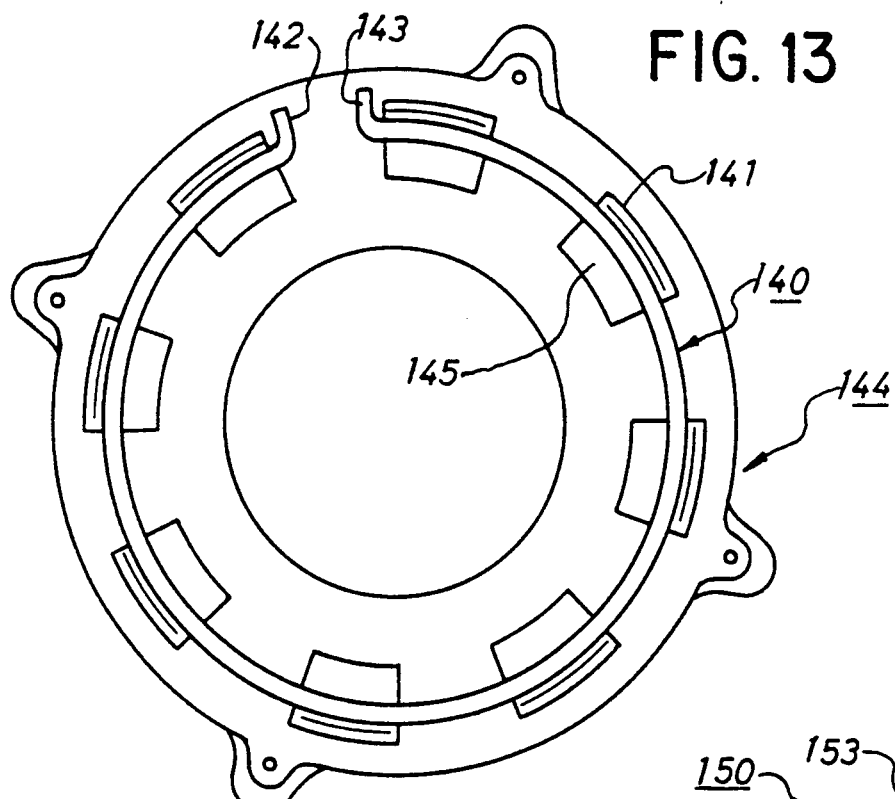
FIG. 13 is a schematic partial rear elevational view of a pressure plate which has another damper member.
Figure 15:
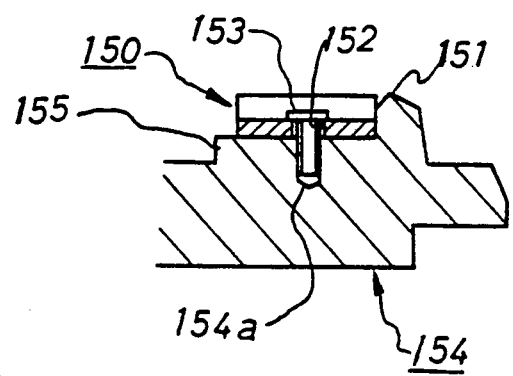
FIG. 15 is a sectional view taken along line X V—X V of FIG. 14.
Figure 14:
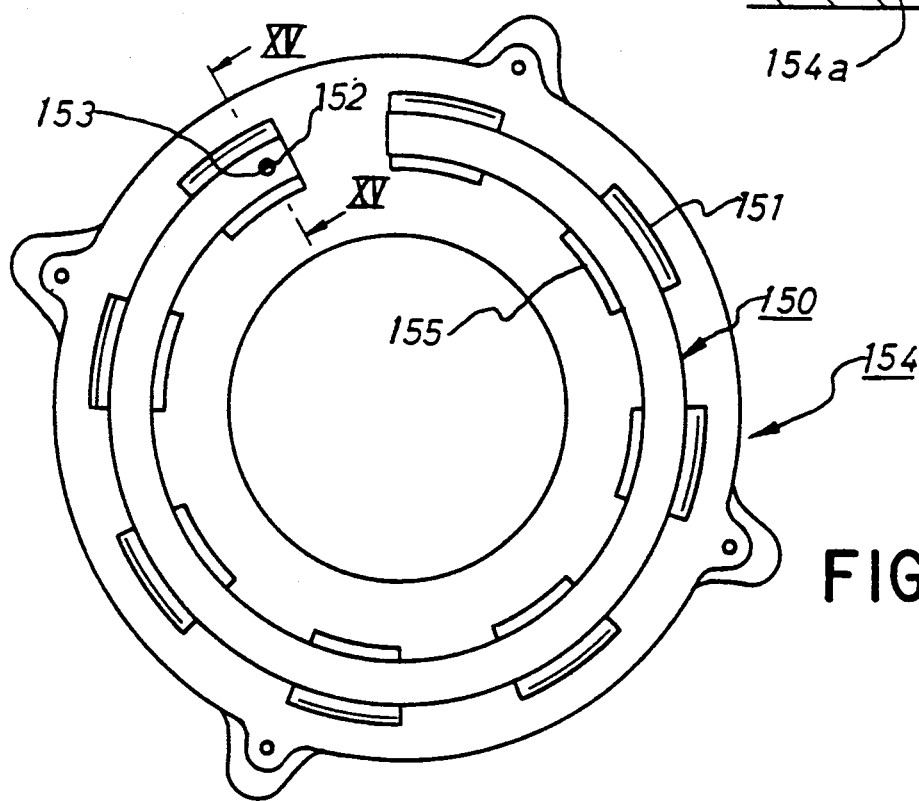
FIG. 14 is a schematic partial rear elevational view of another pressure plate which has still another damper member.
Figure 18:
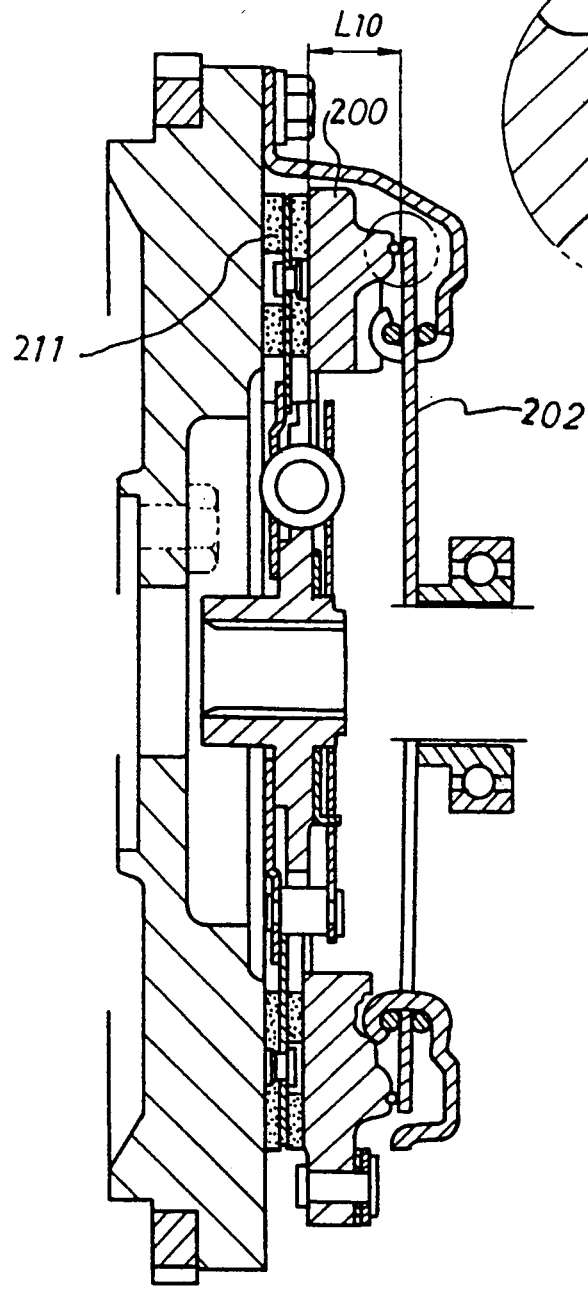
FIG. 18 is a vertical sectional view of a conventional clutch cover assembly.
Figure 18A:
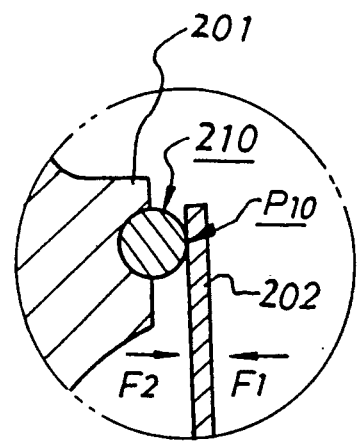

As shown in FIG. 13, a wave wire ring 140, forming a spring rod into a ring-like shape may be employed as another damper member. As shown in FIGS. 14 and 15, a C-shaped wave washer 150, partially cut off, may also be employed as another damper member. The grooves 126 or 135, explained hereinbefore with FIGS. 7, 8, 9, 10, 11 and 12, may be abolished in the case that the wave wire ring 140 or the wave washer 150 are mounted at an inner periphery of the fulcrum portion 141 or 151 on the pressure plate. In FIGS. 14 and 15, 152 is a hole formed in the one end of the wave washer 150. 153 is a screw connecting the wave washer 150 threaded into the hole 152. 154 is a pressure plate. 154a is a tapped hole for the screw 153. 155 are projections formed on the pressure plate 154. An annular wave ring or wave washer may be employed in stead of the wave wire ring 140 or the wave washer 150 and the pegs 142 and screw 153 can be abolished in the case.

Figure 16:
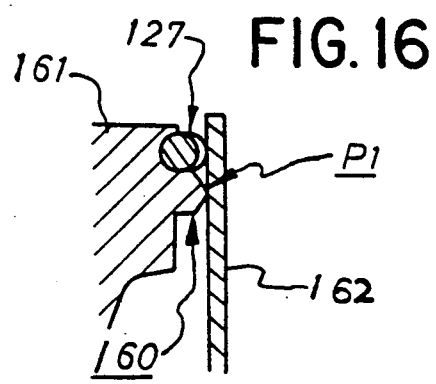
FIG. 16 is an enlarged view of essential portion of another embodiment in which the clutch is engaged.
Figure 17:
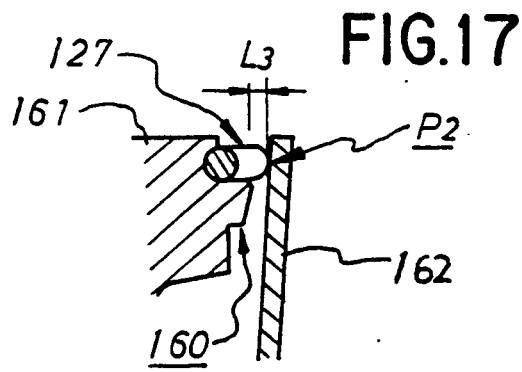
FIG. 17 is an enlarged view of essential portion of the embodiment of FIG. 16 in which the clutch is disengaged.

As shown in FIGS. 16 and 17, the wave wire 127 shown in FIGS. 7, 8, 9, 10, 11 and 12, may be mounted at an outer periphery of the fulcrum portions 160. In FIGS. 16 and 17, 161 is a pressure plate. 162 is a diaphragm spring. In this modification, the wave washer 150 in FIGS. 8 and 9 can be substituted for the damper member of FIGS. 16 and 17.

INDUSTRIAL APPLICABILITY

The clutch cover assembly to which the present invention is applied as described hereinbefore is usefully employed in a clutch of a passenger car, vehicle for industrial construction or the like.

I claim:

1. A clutch cover assembly comprising an annular-shaped pressure plate and diaphragm spring disposed at a rear side of said pressure plate, said pressure plate has a rear surface forming thereon a series of projections arranged in a circumferential direction with spaces therebetween and projecting toward an outer periphery of said diaphragm spring, a damper member mounted at top portions of the projections for receiving the outer periphery of said diaphragm spring and presses said pressure plate toward a flywheel, characterized by that said damper member comprises a series of wave wires formed into a bow-shaped wire rod along a circumferential direction of said pressure plate and having projections rising in an axial direction of said pressure plate, each of said wave wire having at least one end portion forming a stopper member, said projections formed on said pressure plate having top portions forming therein grooves extending in said circumferential direction of said pressure plate, and said wave wires are mounted in said grooves and arranged with spaces therebetween in said circumferential direction.

2. A clutch cover assembly as set forth in claim 1, wherein said grooves have a cross section formed into a rectangular shape.

3. A clutch cover assembly as set forth in claim 1 wherein said wave wires are mounted in said grooves so that each of said wave wires is arranged on two projections formed on said pressure plate with central projections formed on said wave wires aligned with said spaces formed between said projection on said pressure plate.

4. A clutch cover assembly as set forth in claim 1 wherein said stopper member comprises pegs formed on at least end portions of said wave wires.

5. A clutch cover assembly as set forth in claim 1, wherein said pegs are fitted in the holes formed in one of said projection on said pressure plate.

6. A clutch cover assembly comprising an annular-shaped pressure plate and diaphragm spring disposed at the rear side of said pressure plate, said pressure plate having a rear surface having forming thereon a series of projections arranged in a circumferential direction with spaces therebetween and projecting toward an outer periphery of said diaphragm spring, characterized by that said projections have formed thereon fulcrum portions for receiving the outer periphery of said diaphragm spring while said pressure plate is being engaged and mounted thereon a damper member for receiving the outer periphery of said diaphragm spring while said pressure plate is being disengaged.

7. A clutch cover assembly as set forth in claim 6, said damper member comprising a series of wave wires in a circumferential direction of said pressure plate and formed into a bow-shaped wire rod and having projections rising in an axial direction of said pressure plate, each of said wave wires having at least one end portion forming a stopper member, said projections formed on said pressure plate having top portions forming therein grooves extending in said circumferential direction, said wave wires being mounted in said grooves with spaces therebetween in said circumferential direction.

8. A clutch cover assembly as set forth in claim 7, wherein the cross section of said grooves are formed into a rectangular shape.

9. A clutch cover assembly as set forth in claim 7, wherein said wave wires is mounted in said grooves in such a way that each of said wave wires are arranged on two projections formed on said pressure plate and the central projections formed on said wave wires are aligning with the speces formed between said projections on said pressure plate.

10. A clutch cover assembly as set forth in claim 7, wherein said stopper member comprises pegs formed on at least one end portion of said wave wires.

11. A clutch cover assembly as set forth in claim 10, wherein said pegs are fitted in the holes formed in one of said projection on said pressure plate.

12. A clutch cover assembly as set forth in claim 6, wherein said damper member comprises at least one wave wire made of a wire rod formed into a ring shape.

13. A clutch cover assembly as set forth in claim 12, wherein said wave wire ring has end portions forming pegs.

14. A clutch cover assembly as set forth in claim 6, wherein said damper member is in the form of a C-shaped wave washer.

15. A clutch cover assembly as set forth in claim 14, wherein said C-shaped wave washer has an end portion fixed to said projection on said pressure plate by a screw.

16. A clutch cover assembly as set forth in claim 6, wherein said fulcrum portions are formed outwardly from said damper member.

* * * * *